United States Patent
He et al.

(10) Patent No.: US 12,292,938 B2
(45) Date of Patent: May 6, 2025

(54) CONVERSATION-BASED RECOMMENDING METHOD, CONVERSATION-BASED RECOMMENDING APPARATUS, AND DEVICE

(71) Applicant: BEIJING BAIDU NETCOM SCIENCE AND TECHNOLOGY CO., LTD., Beijing (CN)

(72) Inventors: Tianjian He, Beijing (CN); Yi Liu, Beijing (CN); Daxiang Dong, Beijing (CN); Dianhai Yu, Beijing (CN); Yanjun Ma, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 940 days.

(21) Appl. No.: 17/399,016

(22) Filed: Aug. 10, 2021

(65) Prior Publication Data

US 2021/0374356 A1 Dec. 2, 2021

(30) Foreign Application Priority Data

Sep. 21, 2020 (CN) .......................... 202010996994.2

(51) Int. Cl.
  *G06F 40/00* (2020.01)
  *G06F 16/953* (2019.01)
  (Continued)

(52) U.S. Cl.
  CPC ........ *G06F 16/953* (2019.01); *G06F 18/2323* (2023.01); *G06F 18/2411* (2023.01); *G06F 40/35* (2020.01)

(58) Field of Classification Search
  CPC .......... G06N 20/00; G06N 3/045; G06N 3/02; G06N 3/044; G06N 3/0442; G06N 3/0455;
  (Continued)

(56) References Cited

U.S. PATENT DOCUMENTS

2020/0285944 A1  9/2020  Lee et al.
2021/0224879 A1* 7/2021  Chen ..................... G06F 16/245
  (Continued)

FOREIGN PATENT DOCUMENTS

CN   109816101 A   5/2019
CN   110490717 A   11/2019
  (Continued)

OTHER PUBLICATIONS

Wang, X., He, X., Cao, Y., Liu, M., & Chua, T. S. (Jul. 2019). Kgat: Knowledge graph attention network for recommendation. In Proceedings of the 25th ACM SIGKDD international conference on knowledge discovery & data mining (pp. 950-958). (Year: 2019).*

(Continued)

*Primary Examiner* — Edgar X Guerra-Erazo
(74) *Attorney, Agent, or Firm* — Maschoff Brennan

(57) ABSTRACT

The disclosure discloses a conversation-based recommending method. A directed graph corresponding to a current conversation is obtained. The current conversation includes clicked items, the directed graph includes nodes and directed edges between the nodes, each node corresponds to a clicked item, and each directed edge indicates relationship data between the nodes. For each node of the directed graph, an attention weight is determined for each directed edge corresponding to the node based on a feature vector of the node and the relationship data for each node of the directed graph. A new feature vector of the node is determined based on the relationship data and the attention weight of each directed (Continued)

edge. A feature vector of the current conversation is determined based on the new feature vector of each node. An item is recommended based on the feature vector of the current conversation.

18 Claims, 6 Drawing Sheets

(51) Int. Cl.
*G06F 18/2323* (2023.01)
*G06F 18/2411* (2023.01)
*G06F 40/35* (2020.01)

(58) Field of Classification Search
CPC .... G06N 3/0464; G06N 3/047; G06N 3/0475; G06N 3/048; G06N 3/08; G06N 3/082; G06N 3/088; G06N 3/0895; G06N 3/09; G06N 3/091; G06N 3/092; G06N 3/094; G06N 3/096; G06N 3/098; G06N 3/0985; G06N 3/086; G06N 3/084; G06N 5/022; G06F 40/216; G06F 40/20; G06F 40/237; G06F 40/242; G06F 40/274; G06F 40/284; G06F 40/279; G06F 40/289; G06F 40/295; G06F 40/30; G06F 40/35; G06F 40/10; G06F 40/205; G06F 40/211; G06F 40/226; G06F 40/253
See application file for complete search history.

(56) References Cited

U.S. PATENT DOCUMENTS

2021/0366024 A1* 11/2021 Cai ................. G06Q 30/0201
2024/0104403 A1* 3/2024 Wang ................ G06N 3/045

FOREIGN PATENT DOCUMENTS

CN 111046257 A 4/2020
CN 111667067 A 9/2020

OTHER PUBLICATIONS

Wang, G., Zhang, X., Tang, S., Wilson, C., Zheng, H., & Zhao, B. Y. (2017). Clickstream user behavior models. ACM Transactions on the Web (TWEB), 11(4), 1-37. (Year: 2017).*
Sarwar, B., Karypis, G., Konstan, J., & Riedl, J. (Apr. 2001). Item-based collaborative filtering recommendation algorithms. In Proceedings of the 10th international conference on World Wide Web (pp. 285-295). (Year: 2001).*
JP Office Action in Application No. 2021-148407 Dated Dec. 6, 2022.
Search Report for EP application 21190808.2 dated Feb. 3, 2022.
H. Wang et al., "Session-Based Graph Convolutional ARMA Filter Recommendation Model" IEEE Access, Mar. 30, 2020.
OA for CN application 202010996994.2 dated Dec. 30, 2021.
P. Velickovic et al., "Graph Attention Networks" ICLR 2018, Feb. 4, 2018.
S. Wu et al., "Session-Based Recommendation with Graph Neural Networks" Center for Research on Intelligent Perception and Computing National Laboratory of Pattern Recognition, Jan. 24, 2019.

* cited by examiner

CONVERSATION-BASED RECOMMENDING METHOD, CONVERSATION-BASED RECOMMENDING APPARATUS, AND DEVICE

CROSS REFERENCE TO RELATED APPLICATIONS

This application claims priority and benefits to Chinese Application No. 202010996994.2, filed on Sep. 21, 2020, the entire content of which is incorporated herein by reference.

FIELD

The disclosure relates to a field of computer technologies, and particularly to a field of artificial intelligence technologies such as deep learning, and particularly relates to a conversation-based recommending method, a conversation-based recommending apparatus, an electronic device, and a storage medium.

BACKGROUND

In a computer field, a graph is a natural data structure, which may model a group of items (nodes) and a relationship (edge) of the group of items. In recent years, more and more attention is paid to a study of graph analysis by a machine learning method due to powerful expressive force of a graph structure.

Presently, a recommendation system may perform recommendation by combining graph structure data.

SUMMARY

A conversation-based recommending method includes: obtaining a directed graph corresponding to a current conversation, the current conversation including clicked items, the directed graph including nodes and directed edges between the nodes, each node corresponding to a clicked item, and each directed edge indicating relationship data between the nodes; for each node of the directed graph, determining an attention weight for each directed edge corresponding to the node based on a feature vector of the node and the relationship data; for each node of the directed graph, determining a new feature vector of the node based on the relationship data and the attention weight of each directed edge; determining a feature vector of the current conversation based on the new feature vector of each node; and recommending an item based on the feature vector of the current conversation.

An electronic device includes at least one processor and a memory. The memory is communicatively coupled to the at least one processor. The memory is configured to store instructions executable by the at least one processor. The at least one processor is caused to execute the conversation-based recommending method described above when the instructions are executed by the at least one processor.

A non-transitory computer readable storage medium has computer instructions stored thereon. The computer instructions are configured to cause a computer to execute the conversation-based recommending method described above.

It should be understood that, content described in the Summary is not intended to identify key or important features of embodiments of the disclosure, but not used to limit the scope of the disclosure. Other features of the disclosure will become apparent from the following description.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Presently, in a recommendation system, correlation process is generally performed on a directed graph corresponding to a conversation based on a graph neural network. However, when the graph neural network in the related art understands graph structure information for aggregation operation on nodes, merely the average of feature vectors of adjacent nodes of the corresponding node is used. In practical applications, since there may be various relationships between nodes and adjacent nodes, it is not easy to learn useful information efficiently based on averaging the feature vectors, causing an inaccurate recommendation result. In order to obtain an accurate result, the disclosure provides a conversation-based recommending method, a conversation-based recommending apparatus, an electronic device, and a storage medium. With the disclosure, a directed graph corresponding to a current conversation is obtained. For each node of the directed graph, an attention weight for each directed edge corresponding to the node is determined based on a feature vector of the node and relationship data. For each node of the directed graph, a new feature vector of the node is determined based on the relationship data and the attention weight of each directed edge. A feature vector of the current conversation is determined based on the new feature vector of each node. An item is recommended based on the feature vector of the current conversation. In this way, the weight of the directed edge in the directed graph may be adaptively determined by obtaining the directed graph corresponding to the current conversation, as well as the feature vectors and relationship data of the nodes in the directed graph. Nodes may be represented based on the determined weights, which may efficiently learn the useful information and improve the accuracy of the conversation recommendation result.

Description will be made below to a conversation-based recommending method, a conversation-based recommending apparatus, an electronic device, and a storage medium according to embodiments of the disclosure with reference to accompanying drawings.

Figure 1:
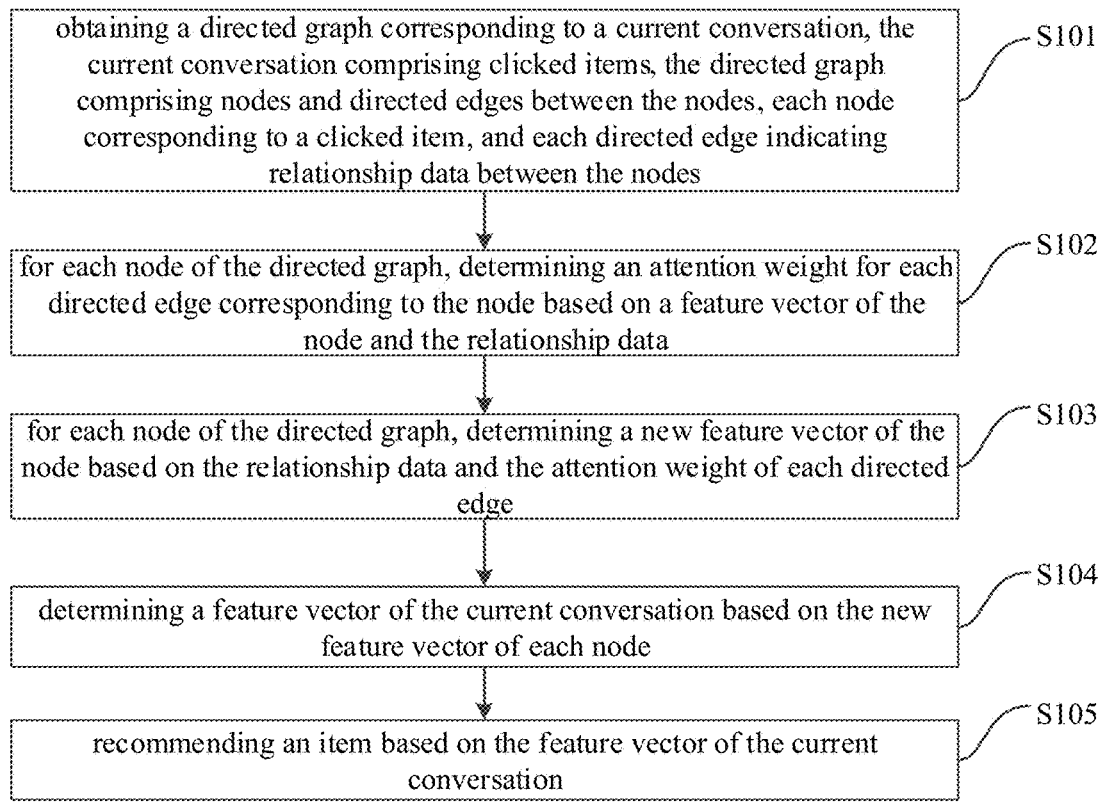
FIG. 1 is a flow chart according to a first embodiment of the disclosure.

FIG. 1 is a flowchart illustrating a conversation-based recommending method according to some embodiments of the disclosure. It is to be noted that, the conversation-based recommending method according to embodiments of the disclosure may be applied to a conversation-based recommending apparatus according to embodiments of the disclosure. The apparatus may be integrated into an electronic device. The electronic device may include a mobile terminal or a server. For example, the mobile terminal includes a smart phone, a tablet, a PAD, and a personal digital assistant, which is not limited in embodiments of the disclosure.

At block S101, a directed graph corresponding to a current conversation is obtained. The current conversation includes clicked items. The directed graph includes nodes and directed edges between the nodes. Each node corresponds to a clicked item. Each directed edge indicates relationship data between the nodes.

The current conversation refers to an interaction record between a user and a website within a time period since the user opened the website, that is, a sequence of clicked items.

Item will be broadly understood in the disclosure, which is related to detailed application scenes. The item includes, but is not limited to, commodity, novel, video, news, etc.

In some examples, the current conversation may be obtained from a webpage browsing log of the user. For the browsing log data of the user collected by the website, a log record of the user may be divided into several conversations based on a preset time interval, and each conversation includes items clicked by the user.

For example, the user is browsing a website A through the electronic device, and ten commodities are clicked continuously within a time period during browsing the website A. The behavior of continuously clicking the ten commodities may be understood as the current conversation. The directed graph corresponding to the current conversation may be constructed based on the commodities in the current conversation. Each node in the directed graph corresponds to a respective clicked commodity. Each directed edge in the directed graph indicates that the user clicks a commodity corresponding to a starting node of the directed edge and then clicks a commodity corresponding to a target node that is pointed to by the directed edge in the current conversation.

Figure 2:
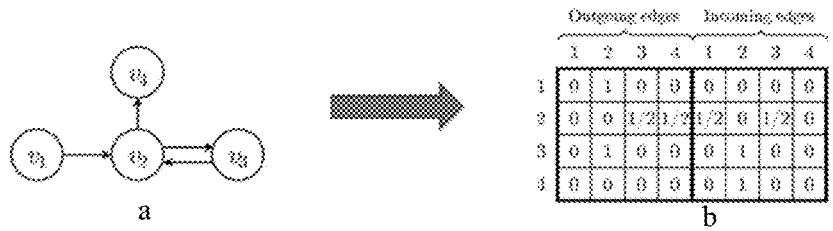
FIG. 2 is a schematic diagram according to a second embodiment of the disclosure.

FIG. 2 illustrates a directed graph. In order to enable the skilled person to clearly understand the relationship data between the nodes, descriptions will be made with reference to FIG. 2.

In some examples, relationships of a directed graph may be expressed by an adjacency matrix, that is, weights corresponding to the directed edges are expressed by the adjacency matrix. When the relationships of the directed graph are expressed by the adjacency matrix, the adjacency matrix may be an in-degree matrix or an out-degree matrix, illustrated as the left figure a of FIG. 2.

For the directed graph illustrated in FIG. 2, before the weight of directed edge in the directed graph is determined based on the feature vector of the node and the relationship data, an adjacency matrix corresponding to the relationships of the directed graph is illustrated as the right figure b of FIG. 2.

It is to be noted that, in graph representation of each conversation, each clicked item is embedded in a unified embedding space. Therefore, the feature vector of the item corresponding to each node may be represented by the feature vector of the node. That is, the feature vector of the node corresponds to the feature vector of the item corresponding to the node.

At block S102, for each node of the directed graph, an attention weight for each directed edge corresponding to the node is determined based on a feature vector of the node and the relationship data.

In some examples, the directed graph corresponding to the current conversation is obtained. The feature vector and the relationship data of each node in the directed graph may be inputted into a pre-trained graph attention network (GAT) model, such that the attention weight of each directed edge corresponding to the node in the directed graph is determined by an attention layer in the graph attention network model.

The feature vector of the node may be understood as the feature vector corresponding to the item in the current conversation, such as word meaning feature, character feature, part-of-speech feature, location feature, and entity feature of the item.

The word meaning feature may perform feature representation of the word meaning by using a pre-trained BERT vector. In order to get a rich semantic feature of a word, such as a tense and an affix, the character feature may be encoded and input into convolutional neural networks with different convolutional kernels, and a part with a largest feature of the word may be extracted by using a maximum pool as a partial feature representation of the word feature vector. The part-of-speech feature may perform feature representation by querying a randomly initialized part-of-speech matrix. The position feature may be encoded by using an absolute position of each word in a sentence and the encoded absolute position is inputted to a randomly initialized coding layer for feature representation of a position vector. The entity feature may label a recognition type using a BIO tagging format. In some examples, all entity tags labeled by corpus are used, and all possible entity type features are summed up.

As an implementation, the feature vector and the relationship data of each node in the directed graph are input into the pre-trained graph attention network model. The graph attention network model may obtain one or more adjacent nodes of each node based on the relationship data, determine a correlation coefficient weight between the node and each adjacent node based on the feature vector of the node and a feature vector of the adjacent node; and determine an attention weight of each node with respect to each adjacent node based on the correlation coefficient weight. The detailed implementation process may be referred to following embodiments.

At block S103, for each node of the directed graph, a new feature vector of the node is determined based on the relationship data and the attention weight of each directed edge.

In some examples, for each node, the graph attention network model may determine the new feature vector of the node based on the relationship data between nodes after determining the attention weight of the directed edge corresponding to the node in the directed graph.

As an implementation, one or more adjacent nodes of the node are obtained based on the relationship data. For each adjacent node, one or more directed edges between the node and the adjacent node are obtained. For each directed edge, the attention weight of the directed edge is obtained. The new feature vector of the node is determined based on feature vectors of one or more adjacent nodes and the attention weights of one or more directed edges. The detailed implementation process may be referred to following embodiments.

At block S104, a feature vector of the current conversation is determined based on the new feature vector of each node.

In other words, after the new feature vector of each node is determined, the feature vector of the current conversation may be determined based on the new feature vectors of the nodes.

In some examples, the new feature vectors of the nodes may be spliced to determine the feature vector of the current conversation. In some examples, the feature vectors of the nodes may also be summed up to obtain the feature vector of the current conversation. In practical applications, other methods may be employed to determine the feature vector of the current conversation based on application requirements. The disclosure does not limit the detailed implementation of determining the feature vector of the current conversation based on the new feature vector of each node in the directed graph.

As another implementation, for the clicked item sequence corresponding to the current conversation, the items at different positions in the clicked item sequence generally have different influences on the current conversation. In order to enable to subsequently perform accurate item recommendation for the current conversation, a possible implementation of the block S104 may be sorting the clicked items in the current conversation; obtaining a sorting order of the clicked items in the current conversation; determining position information of each node in the directed graph based on the sorting order; obtaining a position representation vector of each node by performing vector representation on the position information of the node; determining a target feature vector of each node based on the position representation vector of the node and the new feature vector; and determining the feature vector of the current conversation based on the target feature vector of each node.

At block S105, an item is recommended based on the feature vector of the current conversation.

In some examples, after the feature vector of the current conversation is determined, an item may be recommended for a following behavior of the user based on the feature vector of the current conversation.

According to the conversation-based recommending method of embodiments of the disclosure, the directed graph corresponding to the current conversation may be obtained. The current conversation includes the clicked items. The directed graph includes the nodes and the directed edges between the nodes. Each node corresponds to the clicked item. Each directed edge indicates the relationship data between the nodes. For each node of the directed graph, the attention weight for each directed edge corresponding to the node is determined based on the feature vector of the node and the relationship data. For each node of the directed graph, the new feature vector of the node is determined based on the relationship data and the attention weight of each directed edge. The feature vector of the current conversation is determined based on the new feature vector of each node. The item is recommended based on the feature vector of the current conversation. In this way, the weight of the directed edge in the directed graph may be adaptively determined by obtaining the directed graph corresponding to the current conversation and combining the feature vector and the relationship data of the node in the directed graph, and then the node may be represented based on the determined weight, which may efficiently learn the useful information and improve the accuracy of the conversation recommendation result.

In some examples, the feature vectors and the relationship data of all nodes in the directed graph may be input into the graph attention network model to obtain the new feature vectors of the nodes by the graph attention network model.

The detailed implementation for obtaining the new feature vector of each node in the graph attention network model may be obtaining the attention weight of each directed edge by the attention layer in the graph attention network model in combination with the feature vector of each node, and obtaining the new feature vector of each node by an output layer in combination with the new feature vector of the node as well as the attention weight of each directed edge.

Figure 3:
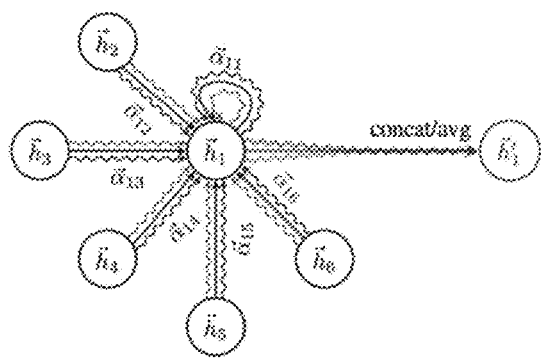
FIG. 3 is a schematic diagram according to a third embodiment of the disclosure.

In order to further improve an expressive ability of the attention layer, as illustrated in FIG. 3, the graph attention neural network model preset in the disclosure may adopt a multi-head attention mechanism. The above updating process of the feature vector of each node is to perform the calculation by each head attention mechanism in the graph attention neural network model in combination with the feature vector of each node in the directed graph and the relationship data. A feature vector of a corresponding node is obtained in combination with each head attention mechanism, and the obtained feature vectors are spliced to obtain a final result of the corresponding node. FIG. 3 is a schematic diagram illustrating a multi-head attention mechanism according to embodiments of the disclosure. K groups of independent attention mechanisms are called, and output results may be merged together to obtain a merged result:

$$\vec{h}'_i = \bigg\|_{k=1}^{K} \sigma\bigg(\sum_{j \in N_i} \alpha_{ij}^k W^k \vec{h}_j\bigg)$$

where $\vec{h}'_i$ represents a new feature vector of the i-th node, $\vec{h}$ represents an original feature vector of the j-th node, $\alpha_{ij}^k$ represents a normalized coefficient of the i-th and j-th nodes, $W^k$ represents a weight matrix corresponding to the K attention mechanisms, and σ represents a non-linear activation function.

Figure 4:
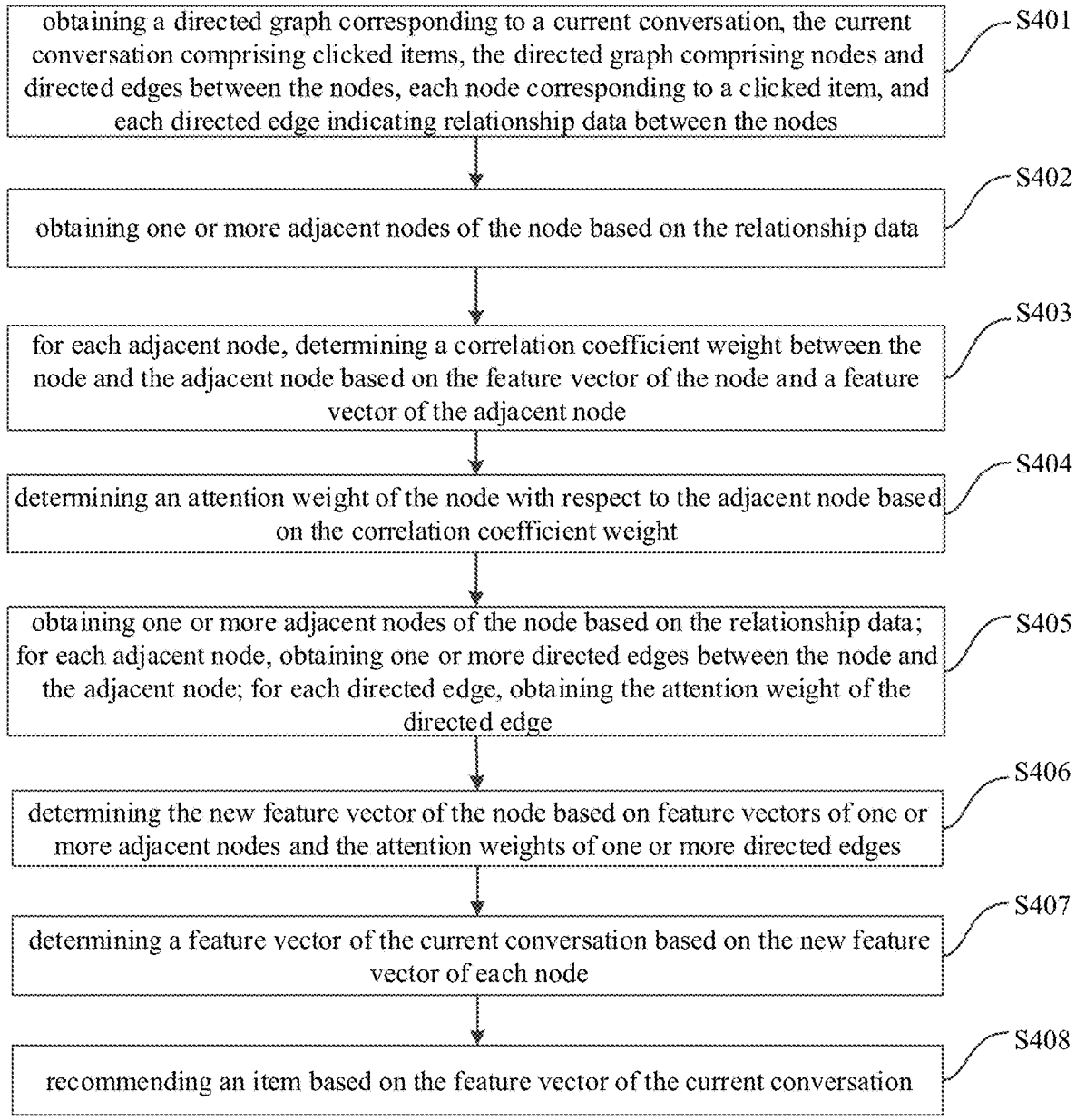
FIG. 4 is a flow chart according to a fourth embodiment of the disclosure.

In order to enable the skilled in the art to easily understand the disclosure, FIG. 4 is a flow chart illustrating a conversation-based recommending method according to a detailed embodiment of the disclosure. As illustrated in FIG. 4, the conversation-based recommending method may include the following.

At block S401, a directed graph corresponding to a current conversation is obtained. The current conversation includes clicked items. The directed graph includes nodes and directed edges between the nodes. Each node corresponds to a clicked item. Each directed edge indicates relationship data between the nodes.

For example, a user is browsing a website A through an electronic device, and ten commodities are clicked continuously within a time period during browsing the website A. The behavior of continuously clicking the ten commodities may be understood as the current conversation. The directed graph corresponding to the current conversation may be constructed based on the commodities in the current conversation. Each node in the directed graph corresponds to a clicked commodity. Each directed edge in the directed graph indicates that the user clicks a commodity corresponding to a starting node of the directed edge and then clicks a commodity corresponding to a target node pointed to by the directed edge in the current conversation.

At block S402, for each node, one or more adjacent nodes of the node are obtained based on the relationship data.

In other words, the one or more adjacent nodes of the node may be determined based on multiple nodes in the directed graph and the relationship data between the nodes.

At block S403, for each adjacent node, a correlation coefficient weight between the node and the adjacent node is determined based on the feature vector of the node and a feature vector of the adjacent node.

It is to be understood that, an importance degree of the feature of the adjacent node relative to the node may be determined based on the feature vector of the node and the feature vector of adjacent node.

In some examples, an intermediate feature vector of the node is obtained by performing linear transformation on the feature vector of the node, and an intermediate feature vector of the adjacent is obtained by performing linear transformation on the feature vector of the adjacent node. A similarity degree between the node and the adjacent node is determined based on the intermediate feature vector of the node and the intermediate feature vector of the adjacent node. The correlation coefficient weight between the node and the adjacent node is determined based on the similarity degree.

Performing linear transformation on the feature vector of the node and the feature vector of the adjacent node respectively may be understood as that a function between two vector spaces maintains the vector addition operation and the scalar multiplication operation. The feature vector of the node and the feature vector of the adjacent node subjected to linear transformation maintain directions unchanged.

In some examples, the similarity degree between the node and the adjacent node may be determined by a Euclidean distance based on the intermediate feature vector of the node and the intermediate feature vector of the adjacent node.

In some examples, the similarity degree between the node and the adjacent node may be determined by a vector space cosine algorithm based on the intermediate feature vector of the node and the intermediate feature vector of the adjacent node.

For example, a set of feature vectors of all nodes is represented by $h=\{\vec{h}_1, \vec{h}_2, \ldots, \vec{h}_N\}$, $\vec{h}_i \in \mathbb{R}^F$, where N represents the number of nodes, and F represents dimensions of a feature vector.

A weight coefficient from an adjacent node vj to a node vi is represented by $e_{ij}=a(W\vec{h}_i, W\vec{h}_j)$, where vi represents the i-th node in the directed graph, W represents a weight parameter of feature transformation of nodes in the layer, and the function a( ) represents a similarity function between the node and the adjacent node. The similarity function may select an inner product of a vector or a neural network with a parameter.

At block S404, an attention weight of the node with respect to the adjacent node is determined based on the correlation coefficient weight.

In order to well allocate the weights, after the correlation coefficient weight between the node and the adjacent node is determined, the correlation coefficient weight may be normalized to obtain a normalized correlation coefficient weight, and the attention weight of the node with respect to the adjacent node may be determined based on the normalized correlation coefficient weight.

In some examples, the correlation coefficient weight may be normalized by a normalized exponential function (softmax function). For example, the normalized correlation coefficient weight is represented by $$\alpha_{ij} = softmax_j(e_{ij}) = \frac{\exp(e_{ij})}{\sum_{k \in N_i} \exp(e_{ik})},$$

where $a_{ij}$ represents the normalized correlation coefficient weight, $e_{ij}$ represents a correlation coefficient weight before the normalization, and k represents all adjacent nodes of a node i.

By integrating the above expressions, a complete formula for calculating the attention weight may be obtained by:

$$\alpha_{ij} = \frac{\exp(LeakyReLU(\vec{a}^T[W\vec{h}_i\|W\vec{h}_j]))}{\sum_{k \in N_i} \exp(LeakyRELU(\vec{a}^T[W\vec{h}_i\|W\vec{h}_k]))},$$

where T represents transformation, ‖ represents a splicing operation, and LeakyReLU represents a non-linear activation function.

At block S405, the one or more adjacent nodes of the node are obtained based on the relationship data. For each adjacent node, one or more directed edges between the node and the adjacent node are obtained. For each directed edge, the attention weight of the directed edge is obtained.

In other words, the one or more adjacent nodes of the node may be determined based on the multiple nodes and the relationship data between the multiple nodes in the directed graph, and the adjacent nodes of the node and the corresponding directed edge between the node and each adjacent node may be obtained.

The attention weight of the node with respect to the adjacent node may be obtained, and the attention weight of the node with respect to the adjacent node may be taken as the attention weight of the node corresponding to the directed edge.

At block S406, the new feature vector of the node is determined based on feature vectors of one or more adjacent nodes and the attention weights of one or more directed edges.

Linear transformation may be performed on the feature vector of each adjacent node to obtain the intermediate feature vector of the adjacent node. The intermediate feature vectors of respective adjacent nodes are weighted and summed based on the attention weights of the corresponding directed edges to obtain the new feature vector of the node.

For example, after the weight coefficients is calculated, the new feature vector may be obtained based on the idea of weighted summation. The new feature vector may be represented by:

$$\vec{h'}_i = \sigma\left(\sum_{j \in N_i} \alpha_{ij} W \vec{h}_j\right).$$

At block S407, a feature vector of the current conversation is determined based on the new feature vector of each node.

In other words, after the new feature vector of each node is determined, the feature vector of the current conversation may be determined based on the new feature vector of the node. A set of new feature vectors may be represented by: $h' = \{\vec{h'}_1, \vec{h'}_2, \ldots, \vec{h'}_N\}$, $\vec{h'}_i \in \mathbb{R}^{F^i}$.

The sorting order of clicked items in the current conversation is obtained. Position information of each node in the directed graph is determined based on the sorting order. The position information of each node is represented by a vector to obtain a position representation vector of each node. For each node, a target feature vector of the node is determined based on the position representation vector and the new feature vector, and the feature vector of the current conversation is determined based on the target feature vector of each node.

At block S408, an item is recommended based on the feature vector of the current conversation.

In other words, after the feature vector of the current conversation is determined, an item may be recommended for a following behavior of the user based on the feature vector of the current conversation.

The similarity degree between the feature vector of each item in the item database and the feature vector of the current conversation may be calculated. A click probability of each item of the item database in the current conversation may be determined based on the similarity degree. Respective items in the item database are sorted based on a descending order of the click probabilities to obtain a sorting result. K items sorted in the front of the sorting result are selected, and the item is recommended based on the K items, where K is an integer greater than or equal to 1.

After the feature vector of the current conversation is obtained based on the new feature vectors of the nodes in the current conversation, similarity degree calculation is performed between the feature vector of the current conversation and the feature vector of each node of the item database. An item recommendation result for the current conversation is accurately determined based on similarity degree calculation, which further improves the accuracy of conversation recommendation.

As a possible implementation, the similarity degree between the feature vector of each item in the item database and the feature vector of the current conversation may be calculated by an included angle cosine algorithm. The higher the similarity degree, the higher the click probability of each item in the item database is.

As another possible implementation, the similarity degree between the feature vector of each item in the item database and the feature vector of the current conversation may be calculated by a Jaccard similarity coefficient.

As another possible implementation, the similarity degree between the feature vector of each item in the item database and the feature vector of the current conversation may be calculated by a correlation coefficient function.

According to the conversation-based recommending method of embodiments of the disclosure, after the current conversation of the user is obtained, the directed graph corresponding to the current conversation is established based on the clicked item in the current conversation. Each node in the directed graph is an item in the current conversation. For each node, the one or more adjacent nodes of the node are obtained based on the relationship data, the correlation coefficient weight between the node and the adjacent node is determined based on the feature vector of the node and the feature vector of the adjacent node. The attention weight of the adjacent node is determined, and the correlation coefficient weight is normalized to determine the attention weight of the adjacent node. The new feature vector of the node is determined based on the feature vector of the adjacent node and the attention weight of the corresponding directed edge. The feature vector of the current conversation is determined based on the new feature vector of each node. The item is recommended based on the feature vector of the current conversation. In this way, adaptive allocation for different adjacent weights is implemented, and the allocation for weights is better implemented, thereby improving an expressive ability of the graph neural network model, learning the useful information efficiently and making the recommendation result more accurate.

In some examples, based on a network architecture of the graph attention network model, it is assumed that an embedding result of a conversation sequence is: $S = [v1, v2, \ldots, vn]$. Two linear transformations $[F_{kin}, F_{kout}] = [W_{kin}, W_{kout}] * S$, $[F_{qin}, F_{qout}] = [W_{qin}, W_{qout}] * S$ are calculated respectively. The similarity degree based on $F_{kin}$ and $F_{kout}$ between all adjacent elements is calculated and normalized based on the directed graph corresponding to the conversation, and weight parameter matrixes $H_{in}$ and $H_{out}$ are obtained. Here, the similarity degree may be simulated by employing a neural network. Weighted sums $H_{in} * F_{qin}$ and $H_{out} * F_{qout}$ are calculated respectively, and results are spliced to obtain the new feature vector of each node. The feature vector of the current conversation is determined based on the new feature vector of each node. The item is recommended based on the feature vector of the current conversation.

For example, a directed graph is illustrated as a figure a of FIG. 2. For the node V2 in the figure a, there are directed paths to nodes V3 and V4. When information aggregation is performed in SR-GNN, V2 obtains the same amount of information from the nodes V3 and V4. However, the weight obtained based on the architecture of the graph attention network model may be related to the potential representation, such that the weight between V2 and V3 may be much greater than that between V2 and V4. In this way, more meaningful information may be learned efficiently, and the recommendation result is more accurate.

In order to learn the useful information efficiently, after the graph attention network model is applied, positional encoding is also applied, to learn the useful information more efficiently and make the recommendation result more accurate.

Verification is performed on three data sets: Diginetica, Yoochoose4 and Yoochoose64. Comparison of a P@20 index value on these data sets is illustrated in a following table. The SR-GNN column represents test results given in an existing paper. The SR-GNN-POS column represents test results after adding the positional encoding. The SR-GAT-POS column represents test results by employing the GAT architecture proposed in the disclosure added with the Positional Encoding. Each of the three tests obtains the conclusion by performing average on values obtained by repeated three times.

By comparing the SR-GNN-POS column and the SR-GAT-POS column, it may be seen that the GAT architecture may obviously improve the effect. These three data sets exceed the existing best effect (SOTA: SR-GNN).

| Test IDs | Data sets | SR-GNN | SR-GNN-POS | SR-GAT-POS |
|---|---|---|---|---|
| 1 | Diginetica(exp) | 51.24 | 51.69 | 51.95 (hidden32:52.02) |
| 2 | Diginetica(piece) | 50.24 | 50.77 | 51.12 |
| 3 | Yoochoose4 | 71.38 | 71.49 | 71.53 |
| 4 | Yoochoose64 | 70.11 | 70.58 | 70.77 |

Note:
the difference between the test 1 and the test 2 lies in different learning rate attenuation strategies. The test 1 employs exponential attenuation, and the test 2 employs a piecewise decreasing scheme.

The GAT architecture employs the multi-head attention mechanism, where head_num is 8, and mapping dimensions of both key and value are 8.

The super-parameters of all GAT architecture tests are taken from SR-GNN alignment. In fact, a better result may be expected if exhaustive super-parameter search is performed.

In the above GAT network structure, no regularization operation is done. Actually, the regularization operation is worth trying in the attention architecture, dropout, including a newly proposed dropedge scheme.

Corresponding to the conversation-based recommending method provided in the above embodiments, embodiments of the disclosure also provide a conversation-based recommending apparatus. Since the conversation-based recommending apparatus provided in this embodiment corresponds to the conversation-based recommending method provided in the above embodiments, the implementation of the conversation-based recommending method is also applicable to the conversation-based recommending apparatus provided in this embodiment, which will not be described in detail in this embodiment. FIGS. 5-8 are block diagrams illustrating a conversation-based recommending apparatus according to embodiments of the disclosure.

Figure 5:
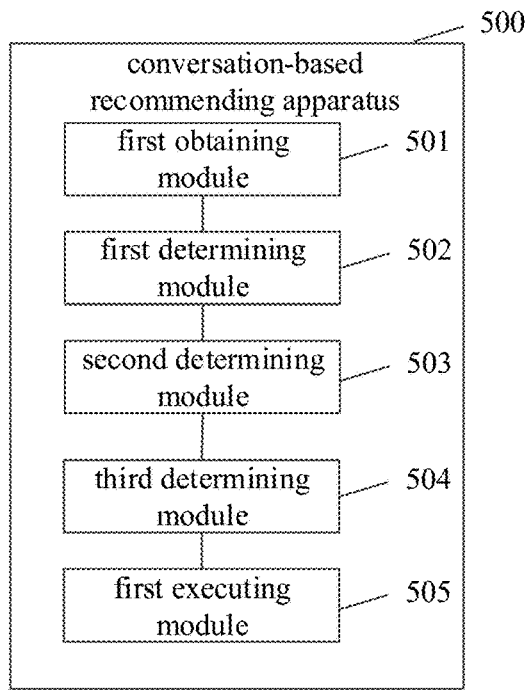
FIG. 5 is a block diagram according to a fifth embodiment of the disclosure.
Figure 6:
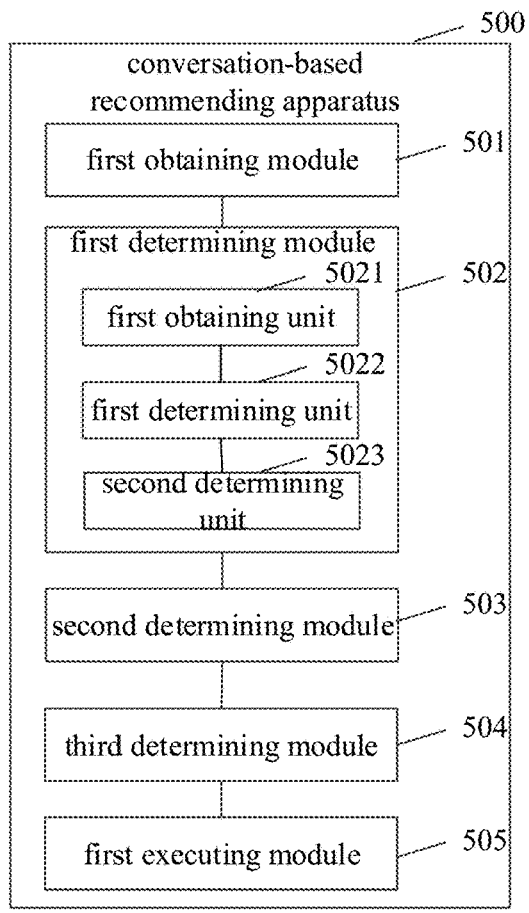
FIG. 6 is a block diagram according to a sixth embodiment of the disclosure.
Figure 7:
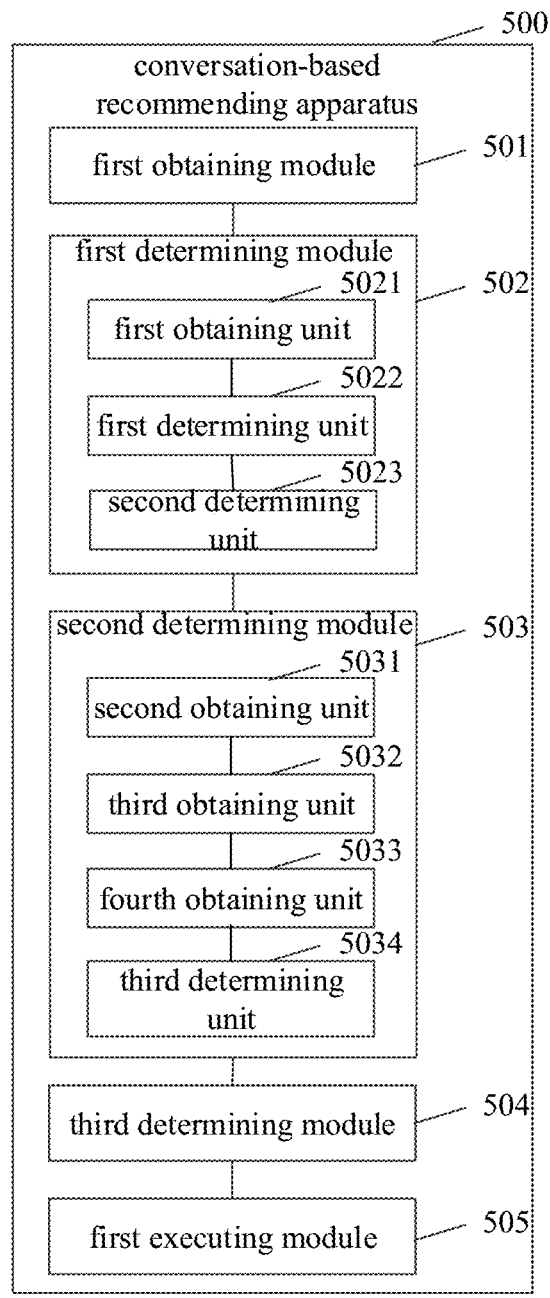
FIG. 7 is a block diagram according to a seventh embodiment of the disclosure.
Figure 8:
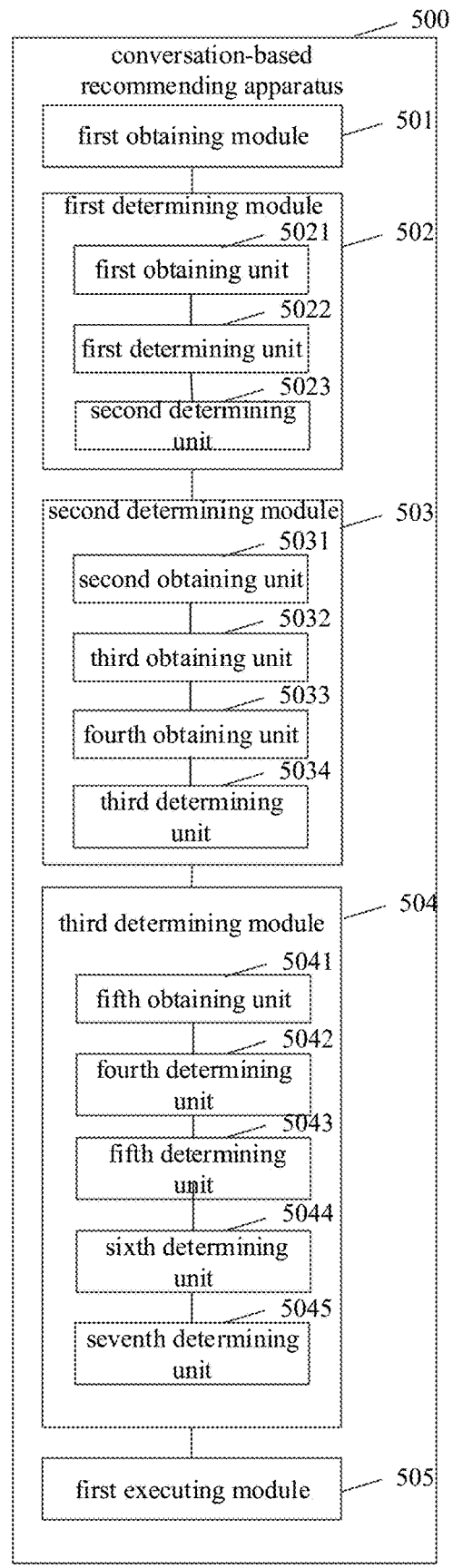
FIG. 8 is a block diagram according to an eighth embodiment of the disclosure.

As illustrated in FIG. 5, the conversation-based recommending apparatus 500 includes: a first obtaining module 501, a first determining module 502, a second determining module 503, a third determining module 504, and a first executing module 505.

The first obtaining module 501 is configured to obtain a directed graph corresponding to a current conversation. The current conversation includes clicked items. The directed graph includes nodes and directed edges between the nodes. Each node corresponds to a clicked item. Each directed edge indicates relationship data between the nodes.

The first determining module 502 is configured to, for each node of the directed graph, determine an attention weight for each directed edge corresponding to the node based on a feature vector of the node and the relationship data. As an example, the first determining module 502 includes: a first obtaining unit 5021, a first determining unit 5022, and a second determining unit 5023. The first obtaining unit 5021 is configured to obtain one or more adjacent nodes of the node based on the relationship data. The first determining unit 5022 is configured to, for each adjacent node, determine a correlation coefficient weight between the node and the adjacent node based on the feature vector of the node and a feature vector of the adjacent node. The second determining unit 5023 is configured to determine an attention weight of the node with respect to the adjacent node based on the correlation coefficient weight.

In embodiments of the disclosure, the first determining unit 5022 is configured to: obtain an intermediate feature vector of the node by performing linear transformation on the feature vector of the node, and obtain an intermediate feature vector of the adjacent node by performing linear transformation on the feature vector of the adjacent node; determine a similarity degree between the node and the adjacent node based on the intermediate feature vector of the node and the intermediate feature vector of the adjacent node; and determine the correlation coefficient weight between the node and the adjacent node based on the similarity degree.

In embodiments of the disclosure, the second determining unit 5023 is configured to: obtain a normalized correlation coefficient weight by performing normalization on the correlation coefficient weight; and determine the attention weight of the node with respect to the adjacent node based on the normalized correlation coefficient weight.

The second determining module 503 is configured to, for each node of the directed graph, determine a new feature vector of the node based on the relationship data and the attention weight of each directed edge. As an example, the second determining module 503 includes: a second obtaining unit 5031, a third obtaining unit 5032, a fourth obtaining unit 5033, and a third determining unit 5034. The second obtaining unit 5031 is configured to obtain the one or more adjacent nodes of the node based on the relationship data. The third obtaining unit 5032 is configured to, for each directed edge, obtain a directed edge between the node and the adjacent node. The fourth obtaining unit 5033 is configured to, for each directed node, obtain the attention weight of the directed edge. The third determining unit 5034 is configured to determine the new feature vector of the node based on feature vectors of the one or more adjacent nodes and the attention weights of the one or more directed edges.

In some embodiments of the disclosure, the third determining unit 6034 is configured to: for each adjacent node, obtain an intermediate feature vector of the adjacent node by performing linear transformation on the feature vector of the adjacent node; and obtain a new feature vector of the node by performing weighted summation on the intermediate feature vectors of one or more adjacent nodes based on the attention weights of one or more directed edges.

The third determining module 504 is configured to determine a feature vector of the current conversation based on the new feature vector of each node. As an example, the third determining module 504 includes: a fifth obtaining unit 5041, a fourth determining unit 5042, a fifth determining unit 5043, a sixth determining unit 5044, and a seventh determining unit 5045. The fifth obtaining unit 5041 is configured to obtain a sorting order of the clicked items in the current conversation. The fourth determining unit 5042 is configured to determine position information of each node in the directed graph based on the sorting order. The fifth determining unit 5043 is configured to obtain a position representation vector of each node by performing vector representation on the position information of the node. The sixth determining unit 5044 is configured to determine a target feature vector of each node based on the position representation vector of the node and the new feature vector. The seventh determining unit 5045 is configured to determine the feature vector of the current conversation based on the target feature vector of each node.

The first executing module 505 is configured to recommend an item based on the feature vector of the current conversation. The first executing module 505 is configured to: calculate a similarity degree between a feature vector of each item in an item database and the feature vector of the current conversation; determine a click probability for each item of the item database in the current conversation based on the similarity degree; obtain a sorting result by sorting items of the item database based on a descending order of the click probability; and select k items sorted in front of the sorting result, and recommend an item based on the k items, where k is an integer greater than or equal to 1.

According to the conversation-based recommending method of embodiments of the disclosure, the directed graph corresponding to the current conversation may be obtained. The current conversation includes the clicked items. The directed graph includes the nodes and the directed edges between the nodes. Each node corresponds to the clicked item. Each directed edge indicates the relationship data between the nodes. For each node of the directed graph, the attention weight for each directed edge corresponding to the node is determined based on the feature vector of the node and the relationship data. For each node of the directed graph, the new feature vector of the node is determined based on the relationship data and the attention weight of each directed edge. The feature vector of the current conversation is determined based on the new feature vector of each node. The item is recommended based on the feature vector of the current conversation. In this way, the weight of the directed edge in the directed graph may be adaptively determined by obtaining the directed graph corresponding to the current conversation and combining the feature vector and the relationship data of the node in the directed graph, and then the node may be represented based on the determined weight, which may efficiently learn the useful information and improve the accuracy of the conversation recommendation result.

According to embodiments of the disclosure, the disclosure also provides an electronic device and a readable storage medium.

Figure 9:
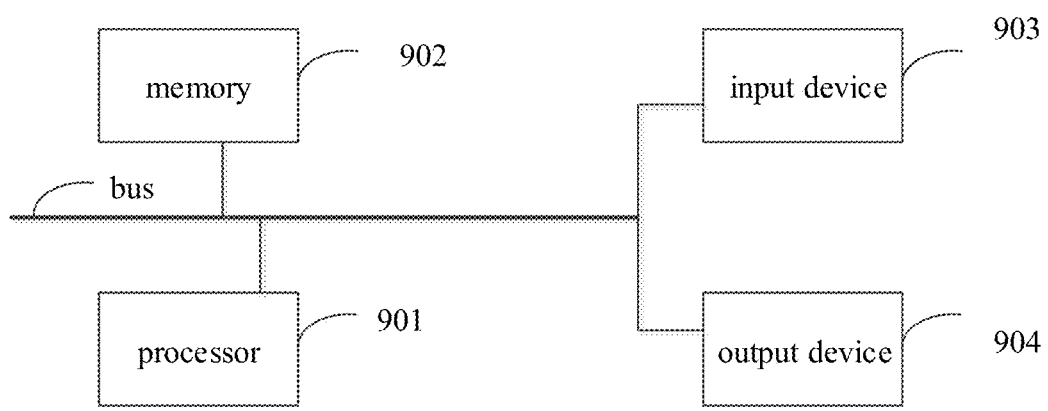
FIG. 9 is a block diagram illustrating an electronic device capable of implementing a conversation-based recommending method according to embodiments of the disclosure.

As illustrated in FIG. 9, FIG. 9 is a block diagram illustrating an electronic device capable of implementing a conversation-based recommending method according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 9, the electronic device includes: one or more processors 901, a memory 902, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 9, a processor 901 is taken as an example.

The memory 902 is a non-transitory computer readable storage medium provided by the disclosure. The memory is configured to store instructions executable by at least one processor, to enable the at least one processor to execute the conversation-based recommending method provided by the disclosure. The non-transitory computer readable storage medium provided by the disclosure is configured to store computer instructions. The computer instructions are configured to enable a computer to execute the conversation-based recommending method provided by the disclosure.

As the non-transitory computer readable storage medium, the memory 902 may be configured to store non-transitory software programs, non-transitory computer executable programs and modules, such as program instructions/module (such as the first obtaining module 501, the first determining module 502, the second determining module 503, the third determining module 504, and the first executing module 505 illustrated in FIG. 5) corresponding to the conversation-based recommending method according to embodiments of the disclosure. The processor 901 is configured to execute various functional applications and data processing of the server by operating non-transitory software programs, instructions and modules stored in the memory 902, that is, implements the conversation-based recommending method according to the above method embodiments.

The memory 902 may include a storage program region and a storage data region. The storage program region may store an application required by an operating system and at least one function. The storage data region may store data created according to prediction usage of the electronic device capable of executing the conversation-based recommending method based on the semantic representation. In addition, the memory 902 may include a high-speed random accessing memory, and may also include a non-transitory memory, such as at least one disk memory device, a flash memory device, or other non-transitory solid-state memory device. In some embodiments, the memory 902 may optionally include memories remotely located to the processor 901, and these remote memories may be connected to the electronic device via a network. Examples of the above network include, but are not limited to, an Internet, an intranet, a local area network, a mobile communication network and combinations thereof.

The electronic device may also include: an input device 903 and an output device 904. The processor 901, the memory 902, the input device 903, and the output device 904 may be connected via a bus or in other means. In FIG. 9, the bus is taken as an example.

The input device 903 may receive inputted digital or character information, and generate key signal input related to user setting and function control of the electronic device capable of implementing the conversation-based recommending method, such as a touch screen, a keypad, a mouse, a track pad, a touch pad, an indicator stick, one or more mouse buttons, a trackball, a joystick and other input device. The output device 904 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

According to the conversation-based recommending method of embodiments of the disclosure, the directed graph corresponding to the current conversation may be obtained. The current conversation includes the clicked items. The directed graph includes the nodes and the directed edges between the nodes. Each node corresponds to the clicked item. Each directed edge indicates the relationship data between the nodes. For each node of the directed graph, the attention weight for each directed edge corresponding to the node is determined based on the feature vector of the node and the relationship data. For each node of the directed graph, the new feature vector of the node is determined based on the relationship data and the attention weight of each directed edge. The feature vector of the current conversation is determined based on the new feature vector of each node. The item is recommended based on the feature vector of the current conversation. In this way, the weight of the directed edge in the directed graph may be adaptively determined by obtaining the directed graph corresponding to the current conversation and combining the feature vector and the relationship data of the node in the directed graph, and then the node may be represented based on the determined weight, which may efficiently learn the useful information and improve the accuracy of the conversation recommendation result.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A conversation-based recommending method, comprising:
    obtaining a directed graph corresponding to a current conversation, the current conversation comprising clicked items, the directed graph comprising nodes and directed edges between the nodes, each node corresponding to a clicked item, and each directed edge indicating relationship data between the nodes;
    for each node of the directed graph, determining an attention weight for each directed edge corresponding to the node based on a feature vector of the node and the relationship data;
    for each node of the directed graph, determining a new feature vector of the node based on the relationship data and the attention weight of each directed edge;
    determining a feature vector of the current conversation based on the new feature vector of each node; and
    recommending an item based on the feature vector of the current conversation;
    wherein determining the feature vector of the current conversation comprises:
    obtaining a sorting order of the clicked items in the current conversation;
    determining position information of each node in the directed graph based on the sorting order;
    obtaining a position representation vector of each node by performing vector representation on the position information of the node;

determining a target feature vector of each node based on the position representation vector of the node and the new feature vector, and determining the feature vector of the current conversation based on the target feature vector of each node.

2. The method of claim 1, wherein determining the attention weight for each directed edge comprises:

obtaining one or more adjacent nodes of the node based on the relationship data;

for each adjacent node, determining a correlation coefficient weight between the node and the adjacent node based on the feature vector of the node and a feature vector of the adjacent node; and determining an attention weight of the node with respect to the adjacent node based on the correlation coefficient weight.

3. The method of claim 2, wherein determining the correlation coefficient weight between the node and the adjacent node comprises:

obtaining an intermediate feature vector of the node by performing linear transformation on the feature vector of the node, and obtaining an intermediate feature vector of the adjacent by performing linear transformation on the feature vector of the adjacent node;

determining a similarity degree between the node and the adjacent node based on the intermediate feature vector of the node and the intermediate feature vector of the adjacent node; and determining the correlation coefficient weight between the node and the adjacent node based on the similarity degree.

4. The method of claim 2, wherein determining the attention weight of the node with respect to the adjacent node comprises:

obtaining a normalized correction coefficient weight by performing normalization on the correlation coefficient weight; and determining the attention weight of the node with respect to the adjacent node based on the normalized correlation coefficient weight.

5. The method of claim 1, wherein determining the new feature vector of the node comprises:

obtaining one or more adjacent nodes of the node based on the relationship data;

for each adjacent node, obtaining one or more directed edges between the node and the adjacent node;

for each directed edge, obtaining the attention weight of the directed edge; and determining the new feature vector of the node based on feature vectors of one or more adjacent nodes and the attention weights of one or more directed edges.

6. The method of claim 5, wherein determining the new feature vector of the node based on the feature vectors of one or more adjacent nodes and the attention weights of one or more directed edges comprises:

for each adjacent node, obtaining an intermediate feature vector of the adjacent node by performing linear transformation on the feature vector of the adjacent node; and obtaining a new feature vector of the node by performing weighted summation on the intermediate feature vectors of one or more adjacent nodes based on the attention weights of one or more directed edges.

7. The method of claim 1, wherein recommending an item comprises:

calculating a similarity degree between a feature vector of each item in an item database and the feature vector of the current conversation;

determining a click probability for each item of the item database in the current conversation based on the similarity degree;

obtaining a sorting result by sorting items of the item database based on a descending order of the click probability; and selecting k items sorted in front of the sorting result, and recommending an item based on the k items, where k is an integer greater than or equal to 1.

8. An electronic device, comprising:

at least one processor; and a memory, communicatively coupled to the at least one processor, wherein the memory is configured to store instructions executable by the at least one processor, and when the instructions are executed by the at least one processor, the at least one processor is configured to:

obtain a directed graph corresponding to a current conversation, the current conversation comprising clicked items, the directed graph comprising nodes and directed edges between the nodes, each node corresponding to a clicked item, and each directed edge indicating relationship data between the nodes;

for each node of the directed graph, determine an attention weight for each directed edge corresponding to the node based on a feature vector of the node and the relationship data;

for each node of the directed graph, determine a new feature vector of the node based on the relationship data and the attention weight of each directed edge;

determine a feature vector of the current conversation based on the new feature vector of each node; and recommend an item based on the feature vector of the current conversation;

wherein determining the feature vector of the current conversation comprises:

obtaining a sorting order of the clicked items in the current conversation;

determining position information of each node in the directed graph based on the sorting order;

obtaining a position representation vector of each node by performing vector representation on the position information of the node;

determining a target feature vector of each node based on the position representation vector of the node and the new feature vector, and determining the feature vector of the current conversation based on the target feature vector of each node.

9. The electronic device of claim 8, wherein the at least one processor is further configured to:

obtain one or more adjacent nodes of the node based on the relationship data;

for each adjacent node, determine a correlation coefficient weight between the node and the adjacent node based on the feature vector of the node and a feature vector of the adjacent node; and determine an attention weight of the node with respect to the adjacent node based on the correlation coefficient weight.

10. The electronic device of claim 2, wherein the at least one processor is further configured to:

obtain an intermediate feature vector of the node by performing linear transformation on the feature vector of the node, and obtain an intermediate feature vector of the adjacent by performing linear transformation on the feature vector of the adjacent node;

determine a similarity degree between the node and the adjacent node based on the intermediate feature vector of the node and the intermediate feature vector of the adjacent node; and determine the correlation coefficient weight between the node and the adjacent node based on the similarity degree.

11. The electronic device of claim 9, wherein the at least one processor is further configured to:

obtain a normalized correction coefficient weight by performing normalization on the correlation coefficient weight; and determine the attention weight of the node with respect to the adjacent node based on the normalized correlation coefficient weight.

12. The electronic device of claim 8, wherein the at least one processor is further configured to:

obtain one or more adjacent nodes of the node based on the relationship data;

for each adjacent node, obtain one or more directed edges between the node and the adjacent node;

for each directed edge, obtain the attention weight of the directed edge; and determine the new feature vector of the node based on feature vectors of one or more adjacent nodes and the attention weights of one or more directed edges.

13. The electronic device of claim 12, wherein the at least one processor is further configured to:

for each adjacent node, obtain an intermediate feature vector of the adjacent node by performing linear transformation on the feature vector of the adjacent node; and obtain a new feature vector of the node by performing weighted summation on the intermediate feature vectors of one or more adjacent nodes based on the attention weights of one or more directed edges.

14. The electronic device of claim 8, wherein the at least one processor is further configured to:

calculate a similarity degree between a feature vector of each item in an item database and the feature vector of the current conversation;

determine a click probability for each item of the item database in the current conversation based on the similarity degree;

obtain a sorting result by sorting items of the item database based on a descending order of the click probability; and select k items sorted in front of the sorting result, and recommending an item based on the k items, where k is an integer greater than or equal to 1.

15. A non-transitory computer readable storage medium having computer instructions stored thereon, wherein the computer instructions are configured to cause a computer to execute the conversation-based recommending method, the method comprising:

obtaining a directed graph corresponding to a current conversation, the current conversation comprising clicked items, the directed graph comprising nodes and directed edges between the nodes, each node corresponding to a clicked item, and each directed edge indicating relationship data between the nodes;

for each node of the directed graph, determining an attention weight for each directed edge corresponding to the node based on a feature vector of the node and the relationship data;

for each node of the directed graph, determining a new feature vector of the node based on the relationship data and the attention weight of each directed edge;

determining a feature vector of the current conversation based on the new feature vector of each node; and recommending an item based on the feature vector of the current conversation;

wherein determining the feature vector of the current conversation comprises:

obtaining a sorting order of the clicked items in the current conversation;

determining position information of each node in the directed graph based on the sorting order;

obtaining a position representation vector of each node by performing vector representation on the position information of the node;

determining a target feature vector of each node based on the position representation vector of the node and the new feature vector, and determining the feature vector of the current conversation based on the target feature vector of each node.

16. The non-transitory computer readable storage medium of claim 15, wherein determining the attention weight for each directed edge comprises:

obtaining one or more adjacent nodes of the node based on the relationship data;

for each adjacent node, determining a correlation coefficient weight between the node and the adjacent node based on the feature vector of the node and a feature vector of the adjacent node; and determining an attention weight of the node with respect to the adjacent node based on the correlation coefficient weight.

17. The non-transitory computer readable storage medium of claim 16, wherein determining the correlation coefficient weight between the node and the adjacent node comprises:

obtaining an intermediate feature vector of the node by performing linear transformation on the feature vector of the node, and obtaining an intermediate feature vector of the adjacent by performing linear transformation on the feature vector of the adjacent node;

determining a similarity degree between the node and the adjacent node based on the intermediate feature vector of the node and the intermediate feature vector of the adjacent node; and determining the correlation coefficient weight between the node and the adjacent node based on the similarity degree.

18. The non-transitory computer readable storage medium of claim 16, wherein determining the attention weight of the node with respect to the adjacent node comprises:

obtaining a normalized correction coefficient weight by performing normalization on the correlation coefficient weight; and determining the attention weight of the node with respect to the adjacent node based on the normalized correlation coefficient weight.

* * * * *